United States Patent [19]
Uhr et al.

[11] Patent Number: 6,004,465
[45] Date of Patent: Dec. 21, 1999

[54] SYSTEM AND PROCESS FOR IODINE RECOVERY

[75] Inventors: Daniel R. Uhr, Huntington Station; Peter M. O'Connell; Glen E. Petaja, both of Cortland; Gregory Collins, Greenlawn; Nelson J. Sobel, Cortland, all of N.Y.

[73] Assignee: Pall Corporation, East Hills, N.Y.

[21] Appl. No.: 08/872,925

[22] Filed: Jun. 11, 1997

Related U.S. Application Data

[60] Provisional application No. 60/019,645, Jun. 11, 1996.

[51] Int. Cl.⁶ .................................................. B01D 61/00
[52] U.S. Cl. ......................... 210/651; 210/650; 210/767; 210/333.01; 210/333.1; 210/195.2
[58] Field of Search .................................. 210/650, 651, 210/767, 652, 333.01, 333.1, 195.1, 195.2, 798; 423/249, 500, 501

[56] References Cited

U.S. PATENT DOCUMENTS

| | | |
|---|---|---|
| 1,837,777 | 12/1931 | Jones . |
| 1,848,081 | 3/1932 | Randolph . |
| 1,936,553 | 11/1933 | Jones . |
| 1,994,416 | 3/1935 | Girvin . |
| 2,385,483 | 9/1945 | Wolff . |
| 3,679,052 | 7/1972 | Asper ........................................ 210/777 |
| 4,131,645 | 12/1978 | Keblys et al. . |
| 4,388,231 | 6/1983 | Person . |
| 4,552,669 | 11/1985 | Sekellick ................................ 210/798 |
| 4,704,210 | 11/1987 | Boze et al. . |
| 4,780,213 | 10/1988 | Ogletree ................................. 210/679 |
| 4,836,936 | 6/1989 | Schewitz ................................ 210/791 |
| 4,857,295 | 8/1989 | Paparatto et al. . |
| 5,062,968 | 11/1991 | Warning . |
| 5,160,428 | 11/1992 | Kuri .................................... 210/333.01 |
| 5,393,433 | 2/1995 | Espenan et al. ........................ 210/650 |
| 5,437,788 | 8/1995 | Geibel et al. . |
| 5,441,633 | 8/1995 | Schewitz ................................ 210/193 |
| 5,464,603 | 11/1995 | Marchin et al. ........................ 423/501 |
| 5,589,072 | 12/1996 | Shanbrom ............................. 210/638 |

OTHER PUBLICATIONS

Coulson et al.; "Chemical Engineering", vol. 2; McGraw–Hill New York, 1955, pp. 414–418, 426–427 & 439–443.
Kirk–Othmer Encyclopedia of Chemical Technology, vol. 18, 1966, pp. 486–495.
Kirk–Othmer Encyclopedia of Chemical Technology, vol. 11, 1966, pp. 847–853.
"Iodine Pricing Stays Up High Despite New Capacity Additions", Chemical Marking Reporter, Mar. 24, 1997, p. 14.

*Primary Examiner*—Ana Fortuna
*Attorney, Agent, or Firm*—Leydig, Voit & Mayer, Ltd.

[57] ABSTRACT

Disclosed is a method and apparatus for recovering iodine from an aqueous suspension. Particulate iodine is formed on a filter septum and forms a cake of solid iodine. The cake is removed by backwash with a liquid or by blowback with a gas. Contact of the iodine with the environment is minimized.

49 Claims, 1 Drawing Sheet

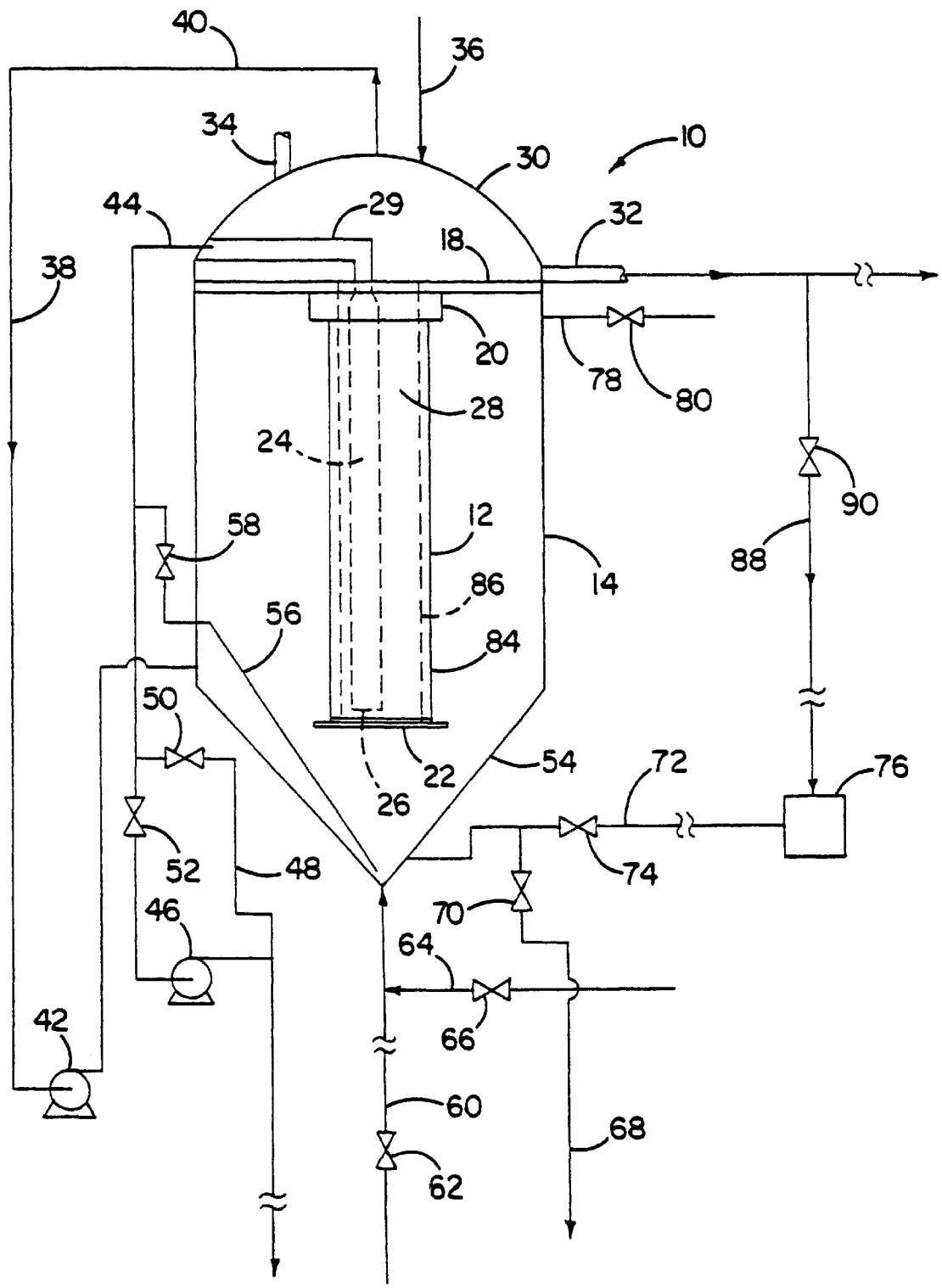

SYSTEM AND PROCESS FOR IODINE RECOVERY

This application claims the benefit of U.S. Provisional Patent Application No. 60/019,645, filed Jun. 11, 1996.

BACKGROUND OF THE INVENTION

Elemental iodine is a valuable chemical having many industrial and medicinal applications. Much attention is therefore focused on the recovery of iodine from various sources, either as a primary product or as a by-product of other industrial processes. Iodine recovery is generally carried out by physical and/or chemical manipulation of an aqueous solution containing soluble ions of iodine. Exemplary solutions include leaching solutions used in nitrate extraction, and brine solutions. The term "brine" in this context includes industrial and naturally occurring salt solutions containing iodine in various salt forms. Exemplary brines are seawater and natural brines such as those associated with petroleum deposits and with solution mining of salt domes. In addition, the secondary recovery of iodine is also carried out, for example, in recycling X-ray photographic plates.

While brines are a significant domestic source of iodine, nitrate ore processing supplies the majority of iodine consumed worldwide and is obtained as a byproduct of nitrate ore processing. Large deposits of sodium nitrate ore are found in Chile, and hence the nitrate produced is commonly referred to as Chilean nitrate. The nitrate ore, known as "caliche", is extracted with a leaching solution to yield soluble sodium nitrate. The nitrate is then recovered from solution by crystallization, and the liquid remaining after removal of the nitrate crystals is called the "mother liquor". Most nitrate ore processing plants use the Guggenheim process, in which crushed ore is leached in a series of vats by countercurrent extraction. After leaching, the ore is washed in countercurrent stages with water to remove residual nitrate solution. The liquid used for extraction in the leaching step consists of a mixture of the mother liquor from the nitrate crystallization and the wash liquid or wash "liquor" recovered from the washing step. Sulfate salts such as $CaSO_4$, $MgSO_4$ and $K_2SO_4$ are also added to the extraction liquid and serve to break-up the double salt $NaNO_3 \cdot Na_2SO_4$ and thereby increase nitrate yield. This double salt forms part of the nitrate in the caliche but is difficult to extract if not treated with sulfates.

Iodine, in the form of sodium iodate ($NaIO_3$), is co-extracted with the nitrate during leaching and remains in the mother liquor after the nitrate is crystallized out. Because the mother liquor is recycled back to the leaching step, the iodate level in the mother liquor builds up and will reach unacceptable levels if not removed. To avoid this, a portion of the mother liquor is drawn off from nitrate processing when the iodate reaches a target concentration (e.g., about 6 g/liter) and is treated to remove the iodate. After iodate removal, the treated mother liquor portion is returned to the nitrate leaching step and serves to reduce the overall iodate concentration in the mother liquor.

Removal and recovery of the iodate in the form of iodine is a two step process. In a first step, the iodate is reduced to iodide by reaction with sodium bisulfite:

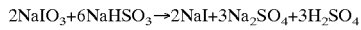

After reaction, a product mixture of sodium iodide and by-product sodium sulfate and sulfuric acid is produced.

In a second step, the product mixture from the first step is reacted with additional mother liquor from the nitrate process. Iodate in the additional mother liquor, in the presence of the sulfuric acid produced in the first step, reacts with the iodide to form elemental iodine as a precipitate:

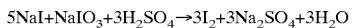

After removal of the precipitated iodine, the treated mother liquor portion is neutralized prior to its return to the nitrate process.

The recovery of iodine from brine employs one of two processes. In a first process, silver iodide is precipitated via addition of silver nitrate to the brine. The silver iodide is filtered and then treated with iron to form ferrous iodide. Chlorine is then used to liberate elemental iodine, which is then recovered by filtration.

In a second process, iodine is recovered as a co-product of natural brine. The brine is acidified with sulfuric acid and treated with a slight excess of chlorine to form elemental iodine as a precipitate. The brine is then pumped to a denuding tower where the iodine is entrained in a counter-current stream of air. The iodine is then absorbed in a solution of hydriodic and sulfuric acids. This solution is then treated with sulfur dioxide to reduce the iodine to (additional) hydriodic acid. A portion of the hydriodic acid is diverted to a reactor where it is reacted with chlorine to form precipitated elemental iodine, which is recovered by filtration and then further processed.

Regardless of whether the iodine source is nitrate processing, brine or secondary recovery, a critical step is the recovery of precipitated iodine from the corresponding aqueous suspension. In the Chilean nitrate process, known procedures for recovering precipitated iodine are marginal at best. Typically, after the second reaction step in which the iodine is precipitated, the treated nitrate mother liquor is conveyed to a filter press where the iodine crystals are separated and recovered manually. This manual operation is labor intensive, time consuming, and hazardous to worker health. At ambient temperatures the vapor pressure of iodine is sufficiently high to permit the release of significant amounts of iodine into the surrounding environment. Workers engaged in the breakdown, cleaning and reassembly of the filter presses are particularly vulnerable, since these functions are accompanied by open exposure to iodine. Furthermore, the release of iodine into the environment is a significant source of pollution.

A further disadvantage of the currently-used filter presses are that a significant amount of mother liquor may remain in the precipitate after its removal from the filter press, requiring further process steps.

The filtration and recovery of iodine from brine processing suffers from many of the same disadvantages. That is, there may be considerable exposure of workers to iodine and the filtration process may be inefficient.

For the above reasons, there is a need in the art for a method for filtering and recovering iodine precipitate which is more efficient, less labor intensive, and minimizes exposure of workers and the environment to iodine.

SUMMARY OF THE INVENTION

In one aspect of the invention, a method for recovering iodine from a liquid suspension containing particulate iodine comprises (i) passing a stream of the suspension through a septum in the forward direction and retaining at least a portion of the particulate iodine on an upstream side, thereby forming a product cake of iodine on the septum and filtrate on the downstream side of the septum, and (ii) recirculating filtrate through the product cake and the septum in the forward direction.

In another aspect of the invention, a method for recovering iodine from a liquid suspension containing particulate iodine comprises (i) passing a stream of the suspension through a septum and retaining at least a portion of the particulate iodine on an upstream side of the septum, thereby forming a product cake of iodine on the septum, wherein passing the stream of the suspension through the septum includes directing the suspension through a porous sintered metal medium with a nominal pore size of about 50 microns or less; and (ii) removing the product cake of iodine from the septum.

In another aspect of the invention, a filter system for recovering iodine from a liquid suspension containing particulate iodine comprises a housing, a filter septum, and a recirculation arrangement. The housing includes a feed chamber having a liquid suspension inlet and a drain. The housing also includes a filtrate chamber having a filtrate outlet. The filter septum is disposed in the housing between the liquid suspension inlet and the filtrate outlet. The recirculation arrangement is coupled to the housing to recirculate filtrate from the filtrate chamber to the feed chamber. The recirculation arrangement provides a rising velocity along the filter septum to evenly distribute the particulate iodine along the filter septum as it forms a product cake on the filter septum. The recirculation arrangement comprises a recirculation loop including at least one recirculation conduit coupled between the filtrate chamber and the feed chamber and recirculation pump coupled to the recirculation conduit. The filter system further comprises an arrangement coupled to the housing to remove the iodine product cake from the filter septum.

In another aspect of the invention, a filter system for recovering iodine from a liquid suspension containing particulate iodine comprises a housing, and a filter septum. The housing includes a feed chamber having a liquid suspension inlet and a drain. The housing also includes a filtrate chamber having a filtrate outlet. The filter septum is disposed in the housing between the liquid suspension inlet and the filtrate outlet. As the liquid suspension containing the particulate iodine flows through the filter septum, a product cake of iodine is deposited on the filter septum. The filter system further comprises an arrangement coupled to the housing to remove the iodine product cake from the filter septum and a transport mechanism coupled to the housing, whereby the iodine product is transported from the housing to an iodine processing facility without exposing the iodine product to the ambient environment.

In another aspect of the invention, a filter system for recovering iodine from a liquid suspension containing particulate iodine comprises a housing, and one or more porous sintered metal filter septa. The housing includes a feed chamber having a liquid suspension inlet and a drain. The housing also includes a filtrate chamber having a filtrate outlet. The one or more porous sintered metal filter septa are disposed in the housing between the liquid suspension inlet and the filtrate outlet, and each of the porous sintered metal filter septa have a nominal pore size of about 50 microns or less and have an upstream surface communicating with the feed chamber and the liquid suspension inlet and a downstream surface communicating with the filtrate chamber and the filtrate outlet, whereby as the liquid suspension containing particulate iodine flows from the liquid suspension inlet in the feed chamber to the upstream surfaces of the porous sintered metal filter septa, through the filter septa, to the downstream surfaces of the filter septa, a product cake of iodine is deposited on the upstream surfaces of the porous sintered metal filter septa. The filter system also comprises a recirculation arrangement including a recirculation pump coupled between the filtrate chamber and the feed chamber to recirculate filtrate from the filtrate chamber to the feed chamber. The filter system further comprises an arrangement coupled to the housing to remove the iodine product cake from the porous sintered metal filter septa.

BRIEF DESCRIPTION OF THE DRAWINGS

For a fuller understanding of the invention, reference should be made to the following detailed description and the drawing which is a schematic view of one embodiment of a filter system for use in the invention.

DETAILED DESCRIPTION OF THE PREFERRED EMBODIMENTS

One embodiment of a filter system of the invention is illustrated in the FIGURE. The filter system, generally indicated by the number 10, includes a single filter septum 12 within a cylindrical housing 14. It will be appreciated, however, that in many applications, a plurality of filter septa 12 may be employed in each filter system and that a plurality of filter systems may be employed. It is further contemplated that the housing 14 may be a shape other than cylindrical.

The filter septum 12 is secured within the housing 14, preferably by means of a tube sheet 16. In the illustrated embodiment, the tube sheet 16 is a top-mounted tube sheet which divides the housing 14 into a feed chamber 17 below the tube sheet 16 and a filtrate chamber 18 above the tube sheet 16. Alternatively, the tube sheet may be a bottom-mounted tube sheet. The filter septum 12 includes an open end cap 20 disposed at an opening in the tube sheet 16 and a closed end cap 22 sealing the other end of the filter septum 12.

The filter septum 12, which is preferably cylindrical in shape, extends from the tube sheet along at least a portion of the longitudinal length of the housing 14. A dip tube 24 is preferably disposed within the filter septum 12 and extends along the length of the septum 12. The end 26 of the dip tube 24 is open and is slightly spaced from the closed end cap 22. The inner diameter of the filter septum is larger than the outer diameter of the dip tube 24, defining an annulus 28 to allow free flow of fluid between the inner wall of the filter septum 12 and the dip tube 24.

The dip tube 24 is secured within the housing 14 and includes a conduit 29 which extends through the tube sheet and exits from the bonnet 30 of the housing 14 of the filter system 10. The filtrate chamber is open to the annulus 28 and the bonnet 30 includes an outlet conduit 32 communicating with the filtrate chamber of the housing 14. The bonnet 30 may also include a vent 34 and a gas feed line 36 communicating with the filtrate chamber. In accordance with an aspect of the invention, the filter system 10 may also comprise a recirculation loop 38, which may include a conduit 40 and a recirculation pump 42. The recirculation conduit 40 is connected at an upstream end to the filtrate chamber and at a downstream end to the feed chamber of the housing 14.

The dip tube conduit 29 exiting the bonnet 30 may be connected to a drain conduit 44 and a drain pump 46. A by-pass conduit 48 provides a by-pass of the pump 46, and valves 50, 52 provide the appropriate by-pass control. A conical section 54 is preferably formed at the lower portion of the housing 14. Extending into the conical section 54 is a heel drain conduit 56 which connects to the drain conduit 44 and includes a valve 58.

A feed conduit 60 connects with the feed chamber 17 of the housing 14 at a feed inlet 61, preferably in the conical section 54, and includes a shut-off valve 62. A rinse conduit 64 and valve 66 are also connected to the feed chamber of the housing 14, for example, via the feed conduit 60. A waste conduit 68 and valve 70 are connected to the conical section 54, preferably at a drain. A product outlet conduit 72 and valve 74 are also connected to the feed chamber, for example, via the drain. In accordance with an aspect of the invention, the product outlet conduit 72 connects to a downstream iodine processing facility 76 which provides for further processing of the product iodine stream. A gas inlet 78 also connects to the feed chamber of the housing 14 and includes valve 80.

In accordance with another aspect of the invention, the filter system may be operated to recover iodine from a liquid suspension containing particulate iodine. The filter system can be operated in a variety of modes. For example, in a first mode, a substantially dry iodine product is produced. By "substantially dry" is meant that the resulting iodine product may be damp but contain little or no free water.

In this first mode, a slurry of iodine crystals is fed via feed conduit 60 to the feed chamber of the housing 14. The slurry may be, for example, the processed mother liquor from a Chilean nitrate process. Iodine crystals grow quickly in the mother liquor, and a product cake formed from small crystals is preferred. Consequently, the mother liquor is preferably fed to the filter system 10 soon after the mother liquor is formed. The filter system is preferably operated continuously, such that iodine crystals in the feed slurry adhere to the outer surface 84 of the septum 12 as a product cake while the slurry liquid continuously passes from the inlet into the feed chamber, through the septum 12 along the annulus 28 of the septum 12, into the filtrate chamber and out the outlet conduit 32. This one pass operation allows quick and efficient reuse of the filtrate. In the case of Chilean nitrate processing, it allows the rapid return of filtered nitrate mother liquor to the nitrate extraction step.

At least a portion of the filtrate is preferably recirculated from the filtrate chamber 18 to the feed chamber 17 of the housing 14 via the recycle conduit 40 and pump 42 which boosts the flow rate along the upstream side of the filter septum 12. Recirculation of a portion of the filtrate is preferred for several reasons. The boosting of the rising flow rate along the upstream side of the filter septum 12 by means of recirculation aids in evenly distributing the iodine crystals along the outer surface of the septum 12. Furthermore, it aids in preventing crystal growth, ensuring that the iodine crystals will have a more uniform, small size. By maintaining a more uniform iodine crystal size, maximum loading on the filter septum 12 is achieved and simultaneously bridging of solid iodine between filter septa (in the case of multiple septa in a single backwash filter housing) is prevented. Bridging is a significant problem not only for the filtration step itself, but also in the blowback step described hereinafter. Bridging can damage the septa and prevent effective blowback. Lastly, by maintaining small, nascent iodine crystals, a surprisingly low pressure drop across the iodine product cake on the filter septum 12 is achieved. This allows a maximum recovery of iodine without the necessity for frequent shutdown of the backwash filter 10 to remove the accumulated iodine product cake.

This result is quite surprising, since it was previously believed that the accumulated iodine product cake would behave in a manner consistent with accepted filter cake theory, that is, as the product cake builds up, a high pressure drop is attained. The lack of a significant pressure drop in the case of an accumulated iodine product cake is not completely understood, but it is believed to be due at least in part to iodine being a hydrophobic material so that large pores and/or a very high voids volume are achieved within the iodine product cake. These large pores and/or high voids volume are believed to occur even in the light of significant crystal growth after the iodine begins to accumulate on the filter septum.

After a predetermined time period has elapsed, the feed is shut off (or redirected to another filter system). The timing of the shut off may be governed by any suitable parameter which indicates that a sufficiently large iodine product cake has accumulated on the filter septum 12, including, for example, a fixed period of time, product cake thickness, or differential pressure across the filter septum 12. Differential pressure is a less preferred parameter since, as noted above, the differential pressure across the iodine product cake is quite low. Thus, an increase in differential pressure may be a less precise indication of filter septum overloading.

An alternative parameter is the concentration of iodine crystals. This first mode of operation is preferably a continuous process in which the iodine slurry is continuously fed into the feed chamber and the filtrate is continuously removed from the filtrate chamber. An alternative mode of operation is a batch process in which the outlet is closed and sufficient iodine slurry is fed into the housing to fill the feed chamber with iodine slurry and fill the filter septum and the filtrate chamber with filtrate. The feed is then discontinued and the recirculation loop operates to circulate the slurry liquid from the filtrate chamber to the feed chamber through the filter septum and back to the filtrate chamber. As the iodine product cake accumulates on the filter septum, the concentration of iodine crystals in the slurry liquid falls. Once the concentration falls to a predetermined level indicating that a sufficiently large iodine product cake has accumulated on the filter septum, the recirculation loop may be shut down.

After feed or recirculation shut down, a rinsing step is preferably carried out, whereby a rinse liquid such as water is fed into the housing 14 via the rinse conduit 64. The rinse liquid displaces the iodine slurry liquid in the feed chamber, the iodine product cake, the filter septum, and the filtrate chamber. The rinse liquid, as well as displaced slurry liquid, then exits the housing 14 through the outlet conduit 32. The displaced slurry liquid and/or rinse liquid may be routed to waste or, in the case of the Chilean nitrate process, returned to the nitrate extraction process.

After rinsing is completed, the filtrate chamber is drained through the outlet conduit 32 and all outlets from the bonnet 30 and the drain in the conical section 54 are closed. The valve 50 in the bypass conduit 48 is then opened, the valve 52 in the drain conduit 44 is closed and air or an inert gas is fed to the feed chamber of the housing 14 via the gas inlet 78. This pressurizes the housing 14 and forces the rinse liquid in the feed chamber of the housing in the forward direction through the iodine product cake, through the filter septum 12, and out through the dip tube 24 and the drain conduit 44.

By maintaining a positive pressure in the forward flow direction, there is minimal disturbance to the iodine product cake on the filter septum. Once the level of rinse liquid in the feed chamber falls to the closed end cap 22, the heel may be drained through the heel drain conduit 56 by closing valve 50, opening valve 52 and 58 and running the pump 46. This empties both the lower portion of the housing 14 and the hollow interior of the filter septum 12.

In an alternative procedure, the pump 46 can be run with valves 52 and 58 open and valve 50 closed at the same time that the positive pressure is established in the cylindrical housing 14 via the gas inlet 78. This arrangement allows the rapid removal of rinse liquid from the housing 14 using both positive gas pressure and/or pump suction.

Once the housing 14 has been drained by one of the above procedures, valves 52 and 58 are closed, and valve 50 maintained open while additional gas is fed to the housing 14 via the gas inlet 78. Preferably, this gas has a due point of 0° C. so as to effect significant drying of the iodine product cake by purging residual moisture. This purging step continues until a desired cake dryness is achieved, usually between about two and about thirty minutes, preferably between about ten and twenty minutes, and most preferably about fifteen minutes. The flow rate of gas (air or an inert gas such as nitrogen) is preferably between about one to about ten scfm and preferably between about two and to about six scfm per square foot of face area of filter septum.

Once the purging step is complete, the forward flow of gas is halted by shutting valve 80 and the filter septum 12 is subjected to blowback by a reverse flow of gas through gas feed line 36, preferably by a reverse pulse of gas. The pulse, which can be, for example, between about 25 and about 150 psi, preferably about 90 psi, flows into the bonnet 30 along the annulus 28 outward from the inner surface 86 of the filter septum 12 and against the iodine product cake formed on the septum. The pulse dislodges the iodine product cake from the exterior surface of the filter septum 12. The iodine product falls to the bottom of the housing 14 along the conical section 54 and into the drain. The walls of the conical section 54 are preferably sloped at a sufficient angle to allow the iodine product to slide along the wall into the drain. The drain may then be closed and the filter system 10 may be placed back on stream. The iodine slurry may again be fed into the feed chamber of the housing 14 to repeat the cycle.

In accordance with an aspect of the invention, the iodine product removed from the filter septum 12 may be transported from the filter system 10 to an iodine processing facility 76 without human exposure to the iodine. For example, from the drain of the housing 14, the iodine product may be transported to the iodine processing facility 76, for example, hydraulically or pneumatically via the product outlet conduit 72. Less preferably, the iodine product may be directed into a sealable container which can be sealed and then transported to the iodine process facility. In either event, the present invention greatly enhances the quality of the environment and the safety of workers in the field of iodine production because no human contact with the iodine product is required.

In a second mode of operation, the iodine product cake may be accumulated on the filter septum 12 as in the first mode of operation but is removed from the filter septum 12 by a liquid backwash rather than a gaseous blowback. The backwash may be a liquid, a mixture of liquid and gas, or a sequential flow of liquid and gas, and any suitable method for backwashing a filter element may be used. Preferred methods are those which limit the amount of liquid used for the backwash.

In this second mode of operation, after the iodine product cake has sufficiently accumulated on the filter septum 12, it is preferably rinsed as previously described but not purged of moisture by a forward flow of gas. Thus, in this mode of operation, the dip tube 24 and conduit 29, the drain conduit 44 and drain pump 46, and the bypass conduit 48 may be eliminated. The filtrate chamber is preferably drained of rinse liquid to a level which is sufficiently low to allow effective backwash. The feed chamber is also drained, preferably through a drain line (not shown) while a pressurized gas is introduced into the feed chamber 17, for example, via gas line 78. Pressurizing the feed chamber as the rinse liquid is completely emptied from the feed chamber prevents the iodine product cake from being damaged. The drain in the feed chamber may then be opened and a gas-assisted backwash may be initiated by feeding gas under pressure through the gas feed line 36 to force any remaining rinse liquid in the filtrate chamber and in the interior of the hollow filter septum 12 outward against the iodine product cake. This reverse flow of backwash dislodges the iodine product cake from the exterior surface of the filter septum 12. The iodine product falls to the bottom of the housing 14, forming a concentrated slurry or wet cake in the conical section 54 which slides into the drain of the housing 14. The drain may then be closed and the cycle may be repeated. Again, in accordance with an aspect of the invention, the iodine product removed from the filter septum 12 may be transported from the filter system 10 to an iodine processing facility 76, for example, via the product outlet conduit 72, without environmental or human exposure to the iodine product. The wet iodine product cake of this second mode may be preferred when further processing of the iodine crystals can accommodate a wet product cake.

In a third mode of operation, the iodine product cake may be accumulated on the filter septum 12 as in the first mode of operation but is removed by sublimation. This third mode of operation may be identical to the first mode described above for accumulating the dry iodine product cake on the filter septum 12 except that after purging moisture from the product cake, a suitable gas at elevated temperature is fed into the housing 14 via a suitable gas inlet. The temperature of the gas is sufficiently high to cause the iodine on the filter septum to vaporize. The gas may be introduced into the filtrate chamber and passed in the reverse direction through the filter septum 12 and the iodine product cake. However, to prevent the iodine product cake from being dislodged from the filter septum 12, the gas is preferably introduced into the feed chamber and passed in the forward direction through the iodine product cake and the filter septum 12. The gas and the iodine vapor pass into the annulus 28 and into the feed chamber and exit the housing 14, for example, through outlet conduit 32. The cycle may then be repeated. Again, in accordance with the invention, the vaporized iodine may then be conveyed to the downstream iodine processing facility 76, for example, via iodine vapor conduit 88 and valve 90 without any human or environmental exposure to the iodine.

In a modification of the third mode of operation, the moisture purge step can be eliminated and the heated gas may be used to sublime the wet iodine product cake. In this alternative embodiment, significant moisture may be entrained with the iodine vapor. The entrained moisture may be removed at the downstream iodine processing facility 76 using appropriate, well known methods such as a condenser.

The components of the filter system may be constructed of materials known in the art to withstand the corrosive environment associated with the production, collection, and processing of iodine. Suitable materials include various grades of stainless steel and the various Hastelloy metals, such as Hastelloy X grade H. Various polymeric materials may also be used judiciously provided that they are sufficiently corrosion resistant. Other materials, such as glass, can also be used.

In particular, the filter septum may comprise any suitable porous medium, including a porous metal, polymeric, or ceramic medium. For example, the porous medium may comprise a sintered fiber metal or powder metal medium or a fibrous polymeric medium or a porous polymeric membrane. In a preferred embodiment, the filter septum is formed from a sintered powdered metal, such as Hastelloy X grade H, and is available from Pall Corporation, Glen Cove, N.Y. under the trade designation Pall Series PSS.

The filter septum is preferably designed to have a pore size smaller than the size of a major portion of the iodine crystals so that the crystals are adequately retained on the filter septum in a single pass. Nascent iodine crystals are very small, e.g., 1 micron or smaller, but quickly grow to 100–200 microns or even larger, e.g., greater than 400 microns. Consequently, the pore size of the filter septum may be from about $1\mu$ to about $100\mu$, preferably from about $5\mu$ to about $50\mu$, and more preferably from about $10\mu$ to about $20\mu$.

The following Example illustrates one or more aspects of the invention.

EXAMPLE

A filter system as illustrated in the FIGURE is used to filter a liquid suspension of iodine crystals. The filter system includes a housing having an inner diameter of about 3.5 to 4 inches and a Pall Series PSS Hastelloy X grade H cylindrical porous metal filter septum having an outer diameter of about 2 inches. The nominal pore size of the septum is $12-15\mu$. Prior to filtration, the filter assembly is used to fluidize the iodine crystals in a balanced (bottom-up) flow of incoming water in order to wash the crystals. Initial iodine crystal size distribution is from about $1\mu$ or less to about $400\mu$ or more.

The liquid suspension of iodine crystals is recirculated through the septum. After formation of an iodine product cake having a depth of 0.33 to 0.5 inch, recirculation is halted, and the iodine product cake is washed by circulating water through the backwash filter in the forward direction. Thereafter, nitrogen is used to purge residual water from the iodine product cake at ambient temperature. Nitrogen at a flow rate of about 1–10 scfm per square foot of face area of the filter septum is passed into the filter housing and through the filter septum in the forward direction for a period of 15 minutes. During the nitrogen purge, residual suspension retained in the annulus between the dip tube and the inner surface of the filter septum is passed out through the dip tube. Passage of nitrogen in the forward direction is continued until a residual moisture content of 0–20% is achieved in the iodine product cake. Flow of the nitrogen is then halted, and a pulse of nitrogen is passed through the filter septum in the reverse flow direction, that is, from the inner side of the filter septum to the outer side. The iodine product cake immediately breaks up and dislodges from the filter septum, falling to the bottom of the filter housing. The iodine product is then recovered.

What is claimed is:

1. A method for recovering iodine from a liquid suspension containing particulate iodine comprising:
    passing a stream of the suspension through a septum in a forward direction and retaining at least a portion of the particulate iodine on an upstream side, thereby forming a product cake on the septum and filtrate on the downstream side of the septum; and
    recirculating filtrate through the product cake and the septum in the forward direction.

2. The method of claim 1 wherein passing a stream of the suspension through the septum comprises continuously passing a stream of suspension through the septum and wherein recirculating filtrate includes recirculating a portion of the filtrate through the product cake and the septum.

3. The method of claim 1 wherein recirculating filtrate comprises recirculating all of the filtrate through the product cake and the septum.

4. The method of claim 1 wherein recirculating filtrate comprises recirculating filtrate through a recirculation loop including a recirculation conduit coupled between a filtrate chamber and a feed chamber.

5. The method of claim 1 further comprising halting flow of the suspension after the product cake accumulates on the septum.

6. The method of claim 1 further comprising rinsing the product cake with a rinse liquid.

7. The method of claim 1 further comprising drying the product cake on the septum.

8. The method of claim 1 further comprising removing the product cake from the septum.

9. The method of claim 8 wherein removing the product cake comprises backwashing the product cake with a liquid, a mixture of a liquid and gas, or a sequential flow of liquid and gas.

10. The method of claim 8 wherein removing the product cake comprises blowback of the product cake by a reverse flow of gas.

11. The method of claim 8 wherein removing the product cake comprises sublimating the product cake.

12. The method of claim 1 wherein passing a stream of the suspension includes passing a stream of the suspension through a porous sintered metal filter septum.

13. The method of claim 12 wherein passing a stream of the suspension comprises passing a stream of the suspension through a porous sintered metal filter septum including a Hastelloy alloy and having a nominal pore size of about 50 microns or less, and wherein removing the product cake comprises blowback of the product cake by a reverse flow of gas.

14. The method of claim 13 wherein recirculating filtrate comprises recirculating filtrate through a recirculation loop including a pump and a recirculation conduit coupled between a filtrate chamber and a feed chamber.

15. The method of claim 1 further comprising rinsing the product cake with a rinse liquid, drying the product cake on the septum, and removing the product cake from the septum; wherein passing a stream of the suspension through the septum comprises continuously passing a stream of suspension through the septum, wherein recirculating filtrate comprises recirculating a portion of the filtrate through a recirculation loop including a pump and a recirculation conduit coupled between a filtrate chamber and a feed chamber, and wherein removing the product cake from the septum comprises blowback of the product cake by a reverse flow of gas.

16. The method of claim 1 further comprising transporting the iodine product to an iodine processing facility without exposing the iodine product to the ambient environment.

17. A method for recovering iodine from a liquid suspension containing particulate iodine comprising:
    passing a stream of the suspension through a septum and retaining at least a portion of the particulate iodine on an upstream side of the septum, thereby forming a product cake of iodine on the septum, wherein passing the stream of the suspension through the septum includes directing the suspension through a porous sintered metal medium with a nominal pore size of about 50 microns or less; and
    removing the product cake of iodine from the septum.

18. The method of claim 17 further comprising transporting the iodine product to an iodine processing facility without exposing the iodine product to the ambient environment.

19. The method of claim 17 wherein the passing the stream of the suspension through the septum comprises directing the suspension through a porous sintered metal medium with a nominal pore size of about 20 microns or less.

20. The method of claim 17 wherein passing a stream of the suspension comprises directing the suspension through a porous sintered metal medium resistant to iodine corrosion.

21. The method of claim 20 wherein directing the suspension includes directing the suspension through a porous sintered metal medium comprising a Hastelloy alloy.

22. The method of claim 17 further comprising rinsing the iodine product cake with a rinse liquid.

23. The method of claim 22 further comprising drying the iodine product cake on the septum.

24. The method of claim 17 wherein removing the product cake of iodine from the septum comprises blowback by a reverse flow of gas, backwashing, or sublimation.

25. The method of claim 17 further comprising halting flow of the suspension after the iodine product cake accumulates on the septum, rinsing the iodine product cake with a rinse liquid and drying the iodine product cake on the septum; wherein passing the stream of the suspension includes directing the suspension through a porous sintered metal medium comprising a Hastelloy alloy, and wherein removing the product cake of iodine from the septum comprises blowback by a reverse flow of gas.

26. A filter system for recovering iodine from a liquid suspension containing particulate iodine comprising:
- a housing including (i) a feed chamber having a liquid suspension inlet and a drain and (ii) a filtrate chamber having a filtrate outlet;
- a filter septum disposed in the housing between the liquid suspension inlet and the filtrate outlet;
- a recirculation arrangement coupled to the housing to recirculate filtrate from the filtrate chamber to the feed chamber, the recirculation arrangement being arranged to provide a rising velocity along the filter septum to evenly distribute the particulate iodine along the filter septum as it forms a product cake on the filter septum, the recirculation arrangement comprising a recirculation loop including at least one recirculation conduit coupled between the filtrate chamber and the feed chamber and a recirculation pump coupled to the recirculation conduit; and
- an arrangement coupled to the housing to remove the iodine product cake from the filter septum.

27. The system of claim 26 further comprising a transport mechanism coupled to the housing and arranged to transport the iodine product from the housing to an iodine processing facility without exposing the iodine product to the ambient environment.

28. The system of claim 26 wherein the filter septum comprises a porous metal medium.

29. The system of claim 28 wherein the porous metal medium includes a sintered metal.

30. The system of claim 29 wherein the sintered metal includes a Hastelloy alloy.

31. The system of claim 28 wherein the filter septum has a nominal pore size of about 50 microns or less.

32. The system of claim 31 wherein the filter septum has a nominal pore size of about 20 microns or less and comprises a sintered metal.

33. The system of claim 26 further comprising an apparatus coupled to the housing to rinse the iodine product cake.

34. The system of claim 26 further comprising an apparatus coupled to the housing to dry the iodine product cake.

35. The system of claim 26 wherein the filter septum includes a porous medium resistant to iodine corrosion.

36. The system of claim 35 wherein the filter septum includes a porous polymeric medium.

37. The system of claim 26 wherein the arrangement to remove the iodine product cake from the filter septum includes a blowback, backwashing, or sublimation apparatus coupled to the housing.

38. The system of claim 26 further comprising an apparatus coupled to the housing to rinse the product cake and an apparatus coupled to the housing to dry the product cake; and wherein the filter septum comprises a porous sintered metal medium having a nominal pore size of about 50 microns or less.

39. A filter system for recovering iodine from a liquid suspension containing particulate iodine comprising:
- a housing including (i) a feed chamber having a liquid suspension inlet and a drain and (ii) a filtrate chamber having a filtrate outlet;
- a filter septum disposed in the housing between the liquid suspension inlet and the filtrate outlet, whereby as the liquid suspension flows through the filter septum a product cake of iodine is deposited on the filter septum;
- an arrangement coupled to the housing to remove the iodine product cake from the filter septum; and
- a transport mechanism coupled to the housing, whereby the iodine product is transported from the housing to an iodine processing facility without exposing the iodine product to the ambient environment.

40. The system of claim 39 wherein the transport mechanism comprises at least one iodine product conduit coupled between the drain of the housing and an iodine processing facility.

41. The system of claim 39 wherein the transport mechanism comprises a sealable container to receive the iodine product, whereby the container may be sealed and transported to an iodine processing facility.

42. The system of claim 39 wherein the transport mechanism comprises a conduit coupled between the housing and a downstream iodine processing facility, allowing sublimed iodine to flow from the housing, through the conduit, and to the iodine processing facility.

43. A filter system for recovering iodine from a liquid suspension containing particulate iodine comprising:
- a housing including (i) a feed chamber having a liquid suspension inlet and a drain and (ii) a filtrate chamber having a filtrate outlet;
- one or more porous sintered metal filter septa disposed in the housing between the liquid suspension inlet and the filtrate outlet, wherein each of the porous sintered metal filter septa have a nominal pore size of about 50 microns or less and have an upstream surface communicating with the feed chamber and the liquid suspension inlet and a downstream surface communicating with the filtrate chamber and the filtrate outlet, whereby as the liquid suspension containing particulate iodine flows from the liquid suspension inlet in the feed chamber to the upstream surfaces of the porous sintered metal filter septa, through the filter septa, to the downstream surfaces of the filter septa, a product cake of iodine is deposited on the upstream surfaces of the porous sintered metal filter septa;

a recirculation arrangement including a recirculation pump coupled between the filtrate chamber and the feed chamber to recirculate filtrate from the filtrate chamber to the feed chamber; and an arrangement coupled to the housing to remove the iodine product cake from the porous sintered metal filter septa.

44. The system of claim 43 further comprising a transport mechanism coupled to the housing and arranged to transport the iodine product from the housing to an iodine processing facility without exposing the iodine product to the ambient environment.

45. The system of claim 43 wherein each of the porous sintered metal filter septa has a nominal pore size of about 20 microns or less.

46. The system of claim 43 wherein each of the porous sintered metal filter septa include porous sintered metal filter septa resistant to iodine corrosion.

47. The system of claim 43 wherein the sintered metal medium includes a Hastelloy alloy.

48. The system of claim 43 further comprising an arrangement coupled to the housing to rinse the iodine product cake and an arrangement coupled to the housing to dry the iodine product cake; and wherein the arrangement to remove the iodine product cake comprises a blowback apparatus, a backwash apparatus, or a sublimation apparatus coupled to the housing.

49. The system of claim 43 wherein the recirculation arrangement further comprises a recirculation conduit coupled between the filtrate chamber and the feed chamber.

* * * * *